Aug. 18, 1964  F. WAHL  3,144,938
APPARATUS FOR TESTING ELECTRICAL COMPONENTS
Filed March 8, 1961  7 Sheets-Sheet 1
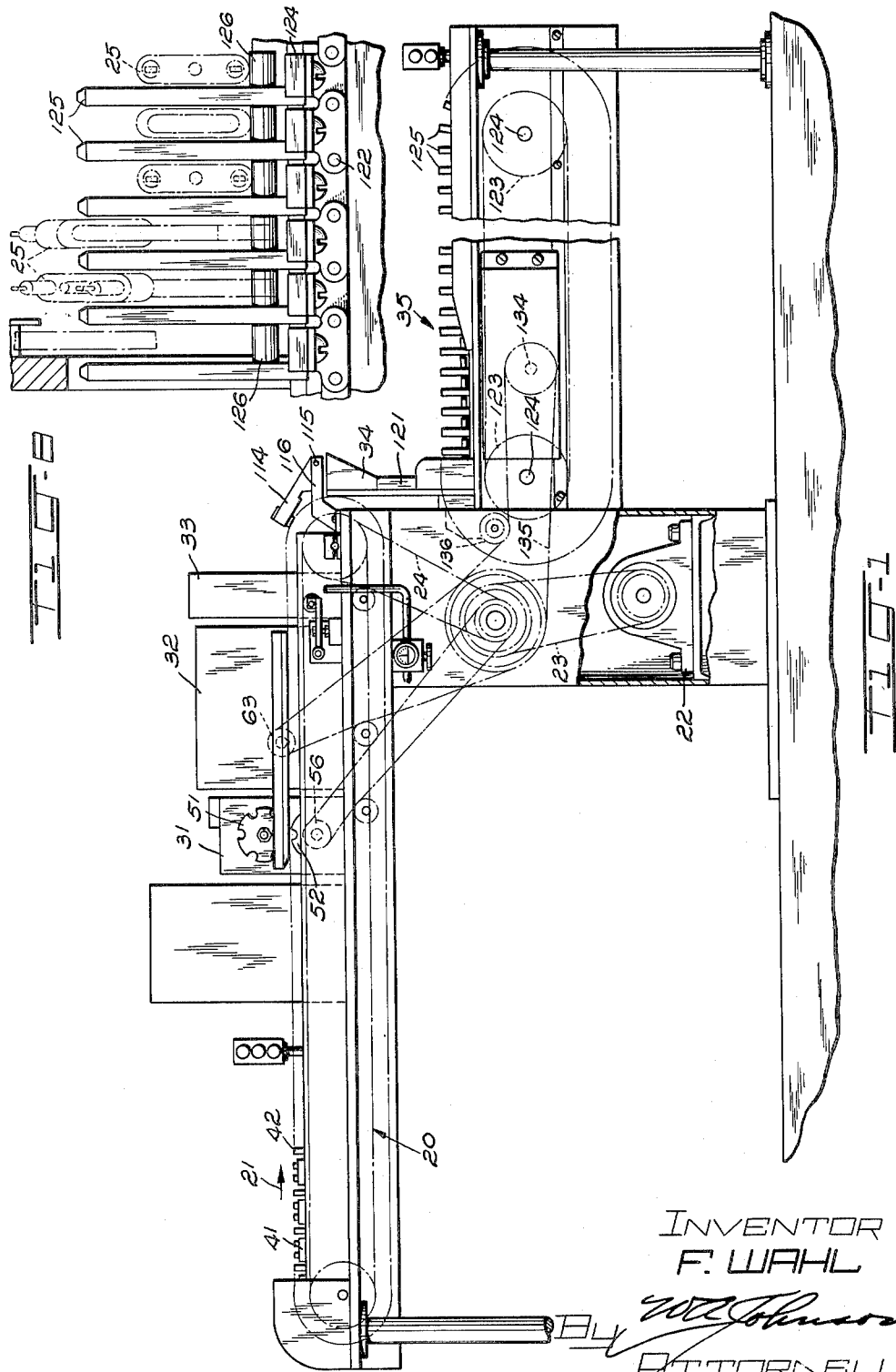
INVENTOR
F. WAHL
By W.W. Johnson
ATTORNEY

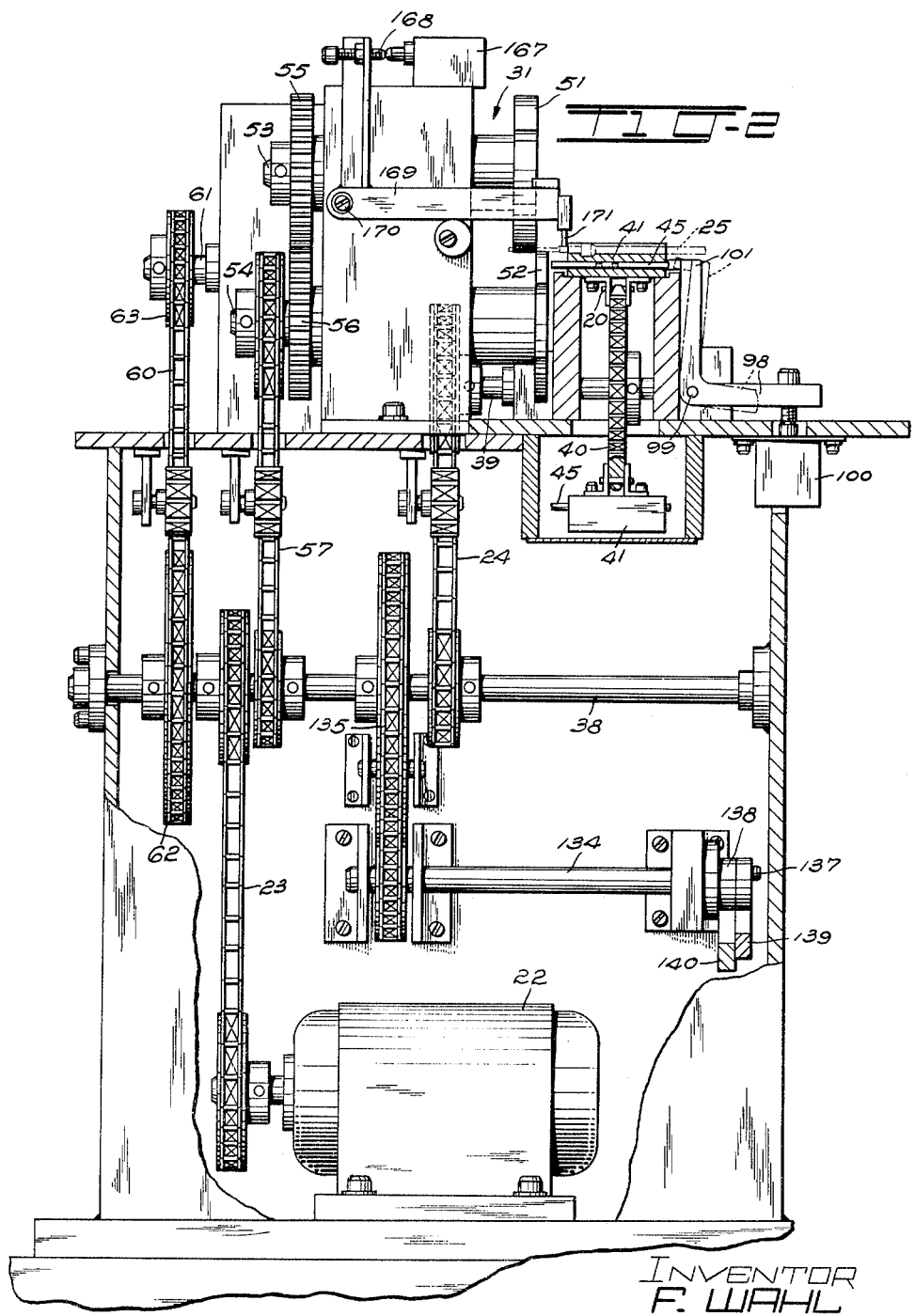

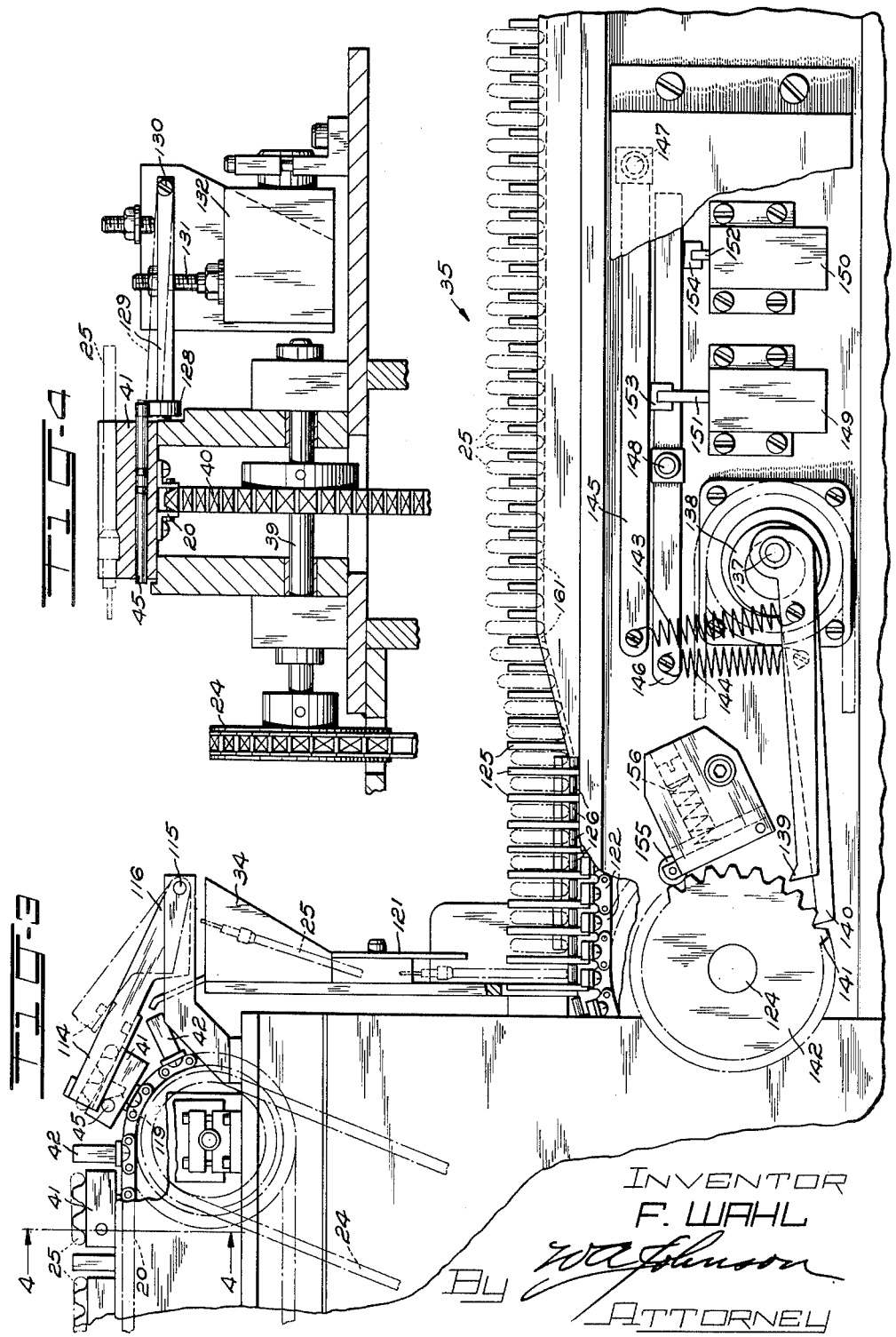

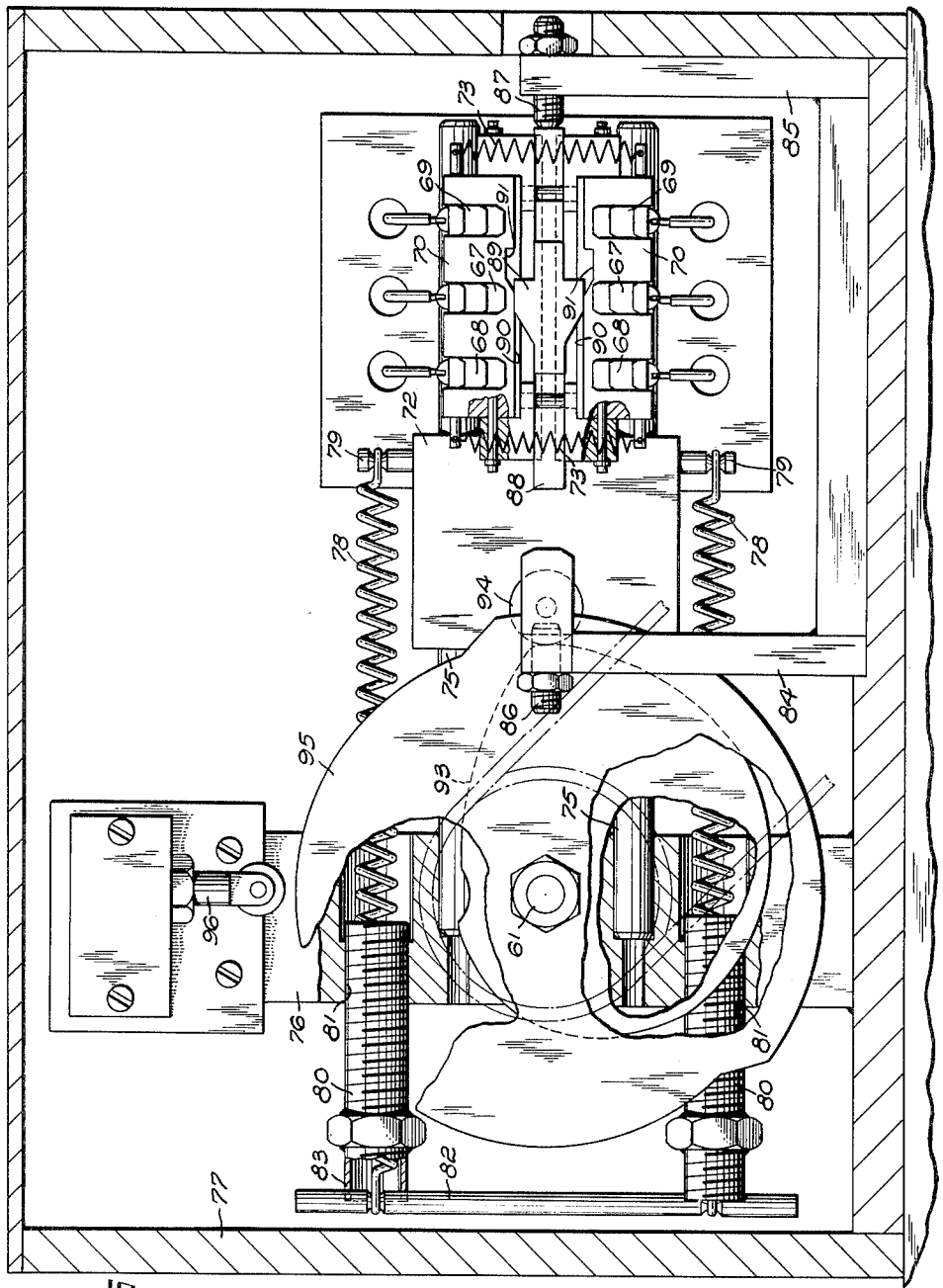

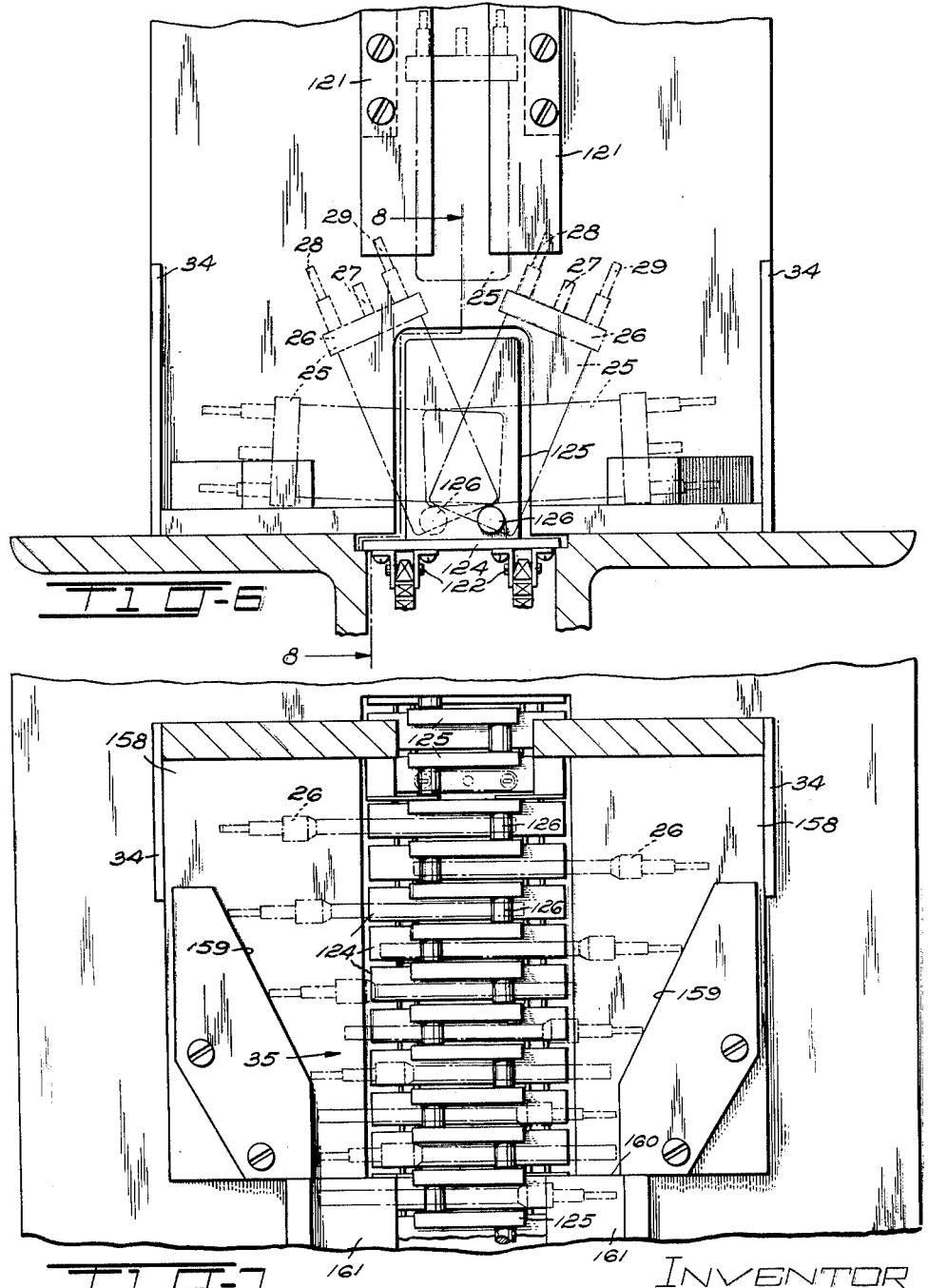

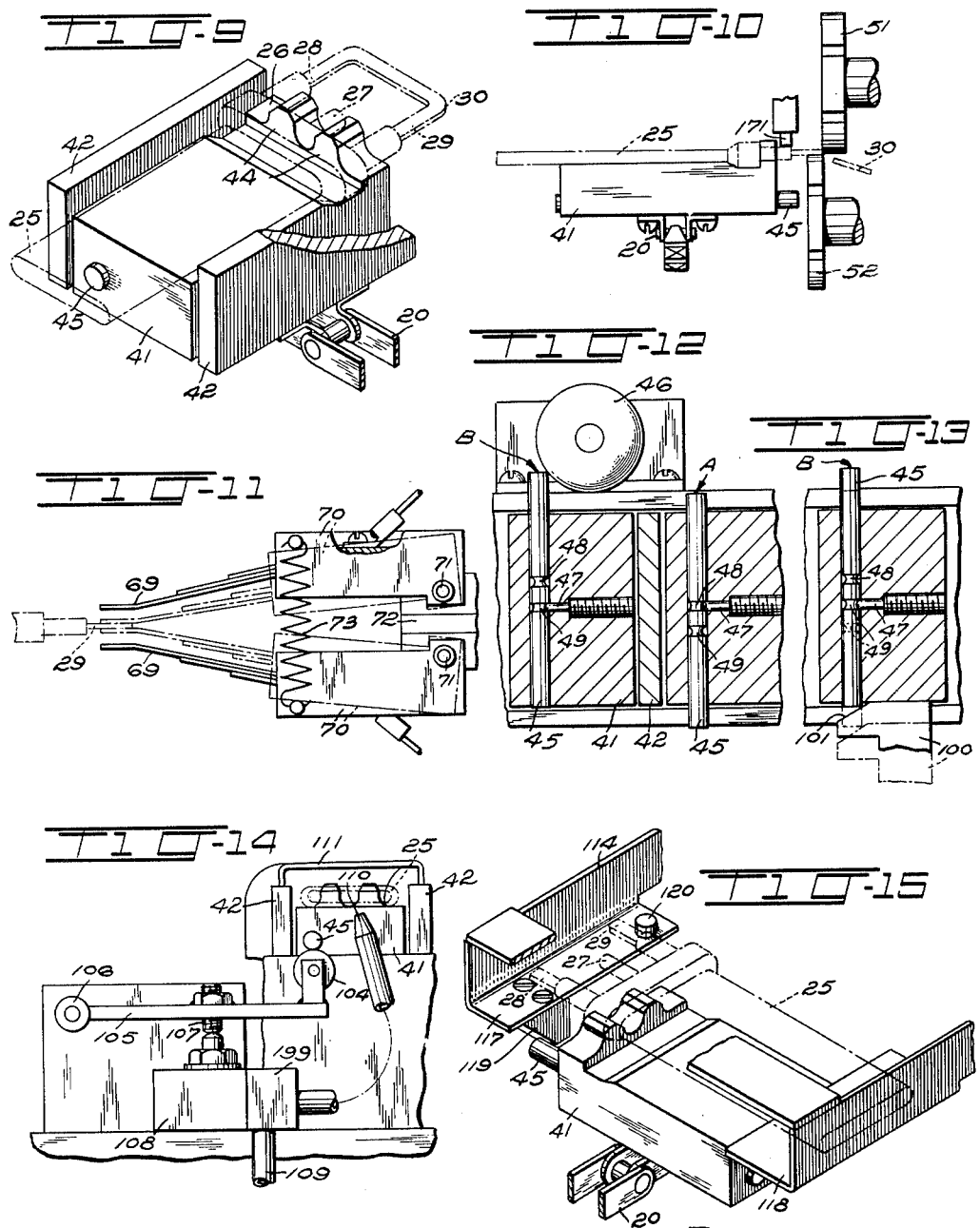

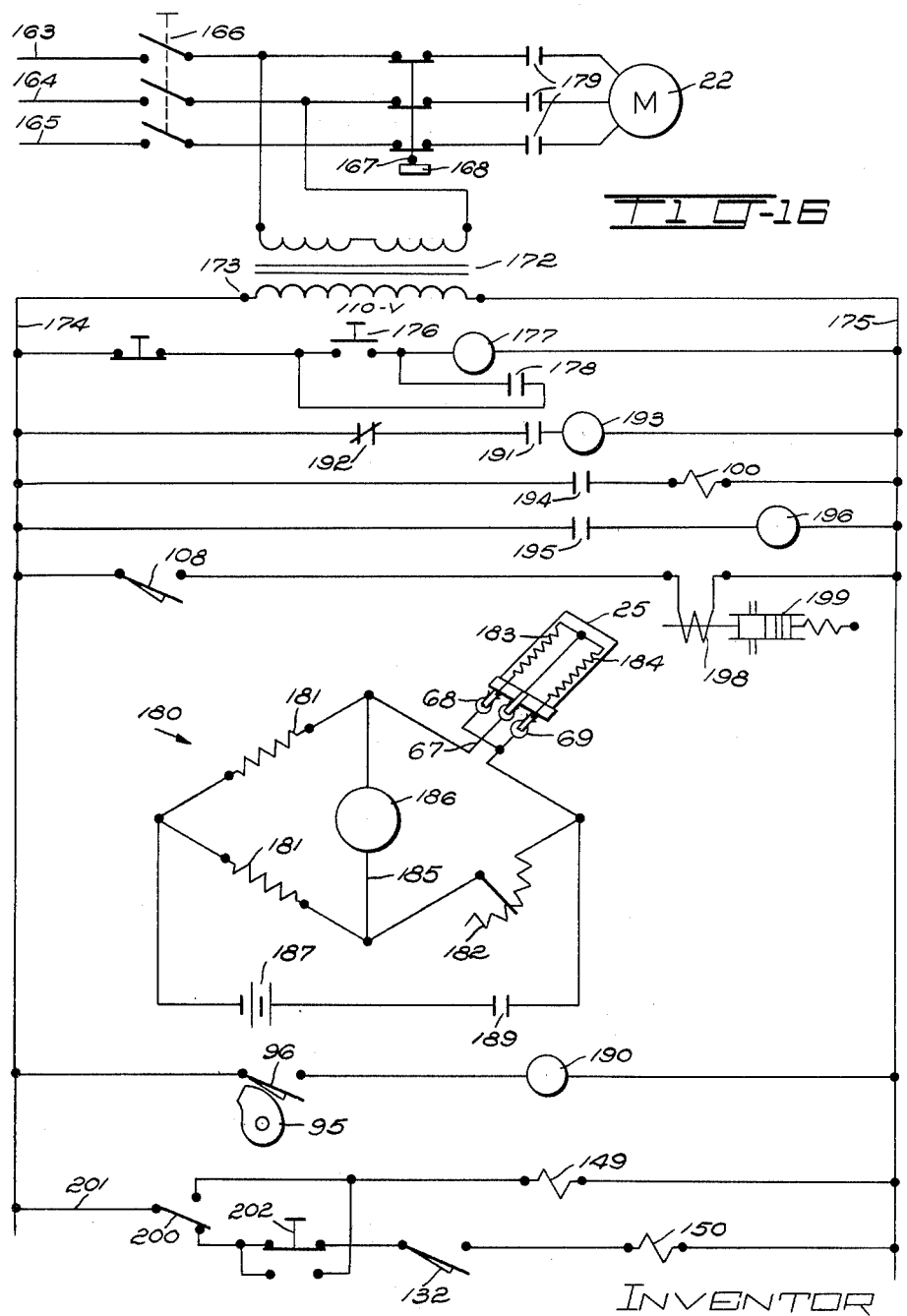

United States Patent Office 3,144,938
Patented Aug. 18, 1964

3,144,938
APPARATUS FOR TESTING ELECTRICAL
COMPONENTS
Frank Wahl, North Bergen, N.J., assignor to Western
Electric Company, Incorporated, a corporation of New
York
Filed Mar. 8, 1961, Ser. No. 94,293
13 Claims. (Cl. 209—81)

This invention relates to apparatus for testing electrical components, particularly flat type resistors and for positioning them for packing.

Flat type resistors used in the communication art include one or two resistance windings on dielectric members supported by an enlarged head which carries the leads for the resistance windings. Up to, and through the completion of, the resistors, two of the leads are connected by an integral cross member which is utilized in the processing of the resistors but prior to use, this cross member must be removed. Furthermore, the resistors must be tested and must have predetermined resistance values prior to being accepted and packaged.

The object of the present invention is an apparatus for efficiently and accurately testing electrical components while moving continuously in a given path.

More specifically, the components, with their leads, are disposed in nests of a conveyor continuously moving through a testing area where clamps are actuated to engage the leads of successive components, move with them a given distance and, during this movement, subject each component to a test by including its resistances in a test circuit, such as one arm of a Wheatstone bridge, and, as a result, the components are accepted and remain in the apparatus or rejected and ejected from the apparatus. Following the testing, the components are caused to drop in a given manner from the first conveyor onto a second conveyor where they will strike orienting members causing them to drop alternately in opposite directions after which they are moved with the second conveyor relative to other orienting means which move them from opposite sides inwardly until they are in a horizontal stacked formation and then raises the components so that they may be removed in desired stacked groups.

Other objects and advantages will be apparent from the following detailed description when considered in conjunction with the accompanying drawings wherein:

FIG. 1 is a front elevational view of the apparatus;

FIG. 2 is a vertical sectional view of the drive means therefor;

FIG. 3 is a fragmentary vertical sectional view of a portion of the apparatus;

FIG. 4 is a fragmentary vertical sectional view taken along the line 4—4 of FIG. 3;

FIG. 5 is an enlarged vertical sectional view of the lead clamps and associated operating mechanism;

FIG. 6 is an enlarged vertical sectional view adjacent the junctures of the two conveyors;

FIG. 7 is a fragmentary top plan view of the structure shown in FIG. 6;

FIG. 8 is a fragmentary detailed view taken substantially along the line 8—8 of FIG. 6;

FIG. 9 is an isometric view of one of the nests for a component;

FIG. 10 is a fragmentary detailed view of the rotary cutters for cutting the excess portion from the leads of each component;

FIG. 11 is a side elevational view of the lead clamps;

FIG. 12 is a fragmentary sectional view of the means to return the memory pins to their normal positions;

FIG. 13 is a fragmentary sectional view of the means to move the memory pins as a result of accepted components;

FIG. 14 is a fragmentary side elevational view illustrating the ejecting means for rejected components;

FIG. 15 is a fragmentary detailed view of means to raise the heads and leads of each component out of its nest near the exit end of the first conveyor and to cause orientation of the component to drop in a given position; and FIG. 16 is a wiring diagram of the control circuits and test set of the apparatus.

Briefly, the apparatus (FIG. 1) includes a first conveyor indicated generally at 20, driven continuously, as indicated by the arrow 21, by a motor 22 and through drive connections 23 and 24. The components in this instance are flat type resistors 25 (FIGS. 9 and 10) each having a head portion 26 with a central threaded lead 27 and outer leads 28 and 29 joined initially by a connecting member 30. A cutting unit 31 (FIG. 1) is positioned in the path of the leads to cut the connecting member 30 from the ends of the leads 28 and 29. After leaving the cutting unit 31, the components move successively into a testing area 32 where the leads 27, 28, and 29 are gripped individually by clamps which are moved with the component and, during this interval, the resistance windings of the component are included in a test set. The test is completed prior to the end of the movement of the clamps with the component, after which the clamps are released and returned rapidly for the next component.

Following the testing, the components move through an ejecting area 33 where those components which have been rejected or failed to pass the test, are forced from the apparatus. When the components are ready to leave the first conveyor 20, they are oriented in such a way that they will drop vertically down a chute 34 with their leads extending upwardly to drop on a second conveyor, indicated generally at 35, which is responsive to the accepted components and will advance only when an accepted component is ready to drop through the chute and onto the second conveyor. The second conveyor causes the components to drop alternately in opposite directions so that they may be stacked more uniformly and are moved together in substantially horizontal stacked formation.

The drive means for the apparatus is shown somewhat in detail in FIG. 2 where the motor 22, through its sprocket and chain connection 23, drives a shaft 38 which is rotatably mounted as shown. The connection 24 is a sprocket and chain structure connecting a shaft 39 with the shaft 38. The shaft 39 has a sprocket 40 mounted thereon, this sprocket driving a chain (FIG. 9) which constitutes the first conveyor 20. The chain or conveyor 20 has equally spaced nests 41 mounted on certain links thereof and side members 42 mounted on other links thereof, as illustrated more clearly in FIG. 3. Each nest is grooved at 43 for the enlarged head portion 26 of each component and provided with upwardly extending members 44 to straddle the lead 27 and to extend between the lead 27 on each side thereof and their adjacent leads 28 and 29. Through this means, namely the nest and the side members 42, the components are held in predetermined like positions in the conveyor. Each nest 41 is provided with a memory pin 45 which may be moved into its normal position as the nests move by a roller 46 (FIG. 12). Furthermore, each nest is provided with a spring-pressed plunger 47 receivable in either of two circumferential grooves 48 and 49 of the memory pin 45, the groove 48 engaging the plunger when the memory pin 45 is in its normal position and the groove 49 engaging the plunger when the memory pin 45 is in its operating position.

The cutting unit 31 includes companion cutting wheels 51 and 52 positioned in the path of each connecting member 30, the diameter of the cutting wheel 52 being such that it will act as a support for each lead 28 and 29 while the diameter of the cutting wheel 51 is such that it will extend through the area occupied by the connecting member 30 to cooperate with the wheel 52 for cutting its successive connections of the member 30 from the leads 28 and 29. The cutters 51 and 52 are mounted respectively on shafts 53 and 54 which support like gears 55 and 56 inter-engaging each other so that when the shaft 54 is driven by a sprocket and chain connection 57 with the shaft 38, the shafts 53 and 54 will be rotated in opposite directions to impart like movements to the cutters 51 and 52.

In the testing area 32, the mechanism shown in FIG. 5 is driven through a sprocket and chain connection 60 (FIG. 2) between the shaft 38 and a cam shaft 61. In this connection, a sprocket 62, mounted on the shaft 38, is much larger than the sprocket 63, mounted on the cam shaft 61, to bring about electrical connections with the leads of the successive components to include them in a test set while moving with the leads, to release the leads of the tested component and return rapidly for connection with the next component. Prior to considering the mechanism of FIG. 5, attention is directed first to FIG. 11 illustrating an end view of the lead clamps. Actually there are three pairs of companion lead clamps 67, 68, and 69 formed of series of leaf springs and connected at their inner ends to jaws 70. The jaws 70 are pivoted at 71 on a carriage 72 and normally are urged toward each other by springs 73 to move the free ends of the clamps into close engagement with their respective leads. The jaws or opposing members of each pair of clamps are connected electrically in the test circuit. The carriage 72 has parallel apertures therein and is mounted for sliding movement on parallel rods 75 which are mounted in a vertical support 76 in a housing 77. Springs 78, having like ends fixed to pins 79 mounted on the carriage 72, extend through externally threaded tubular members 80 which are adjustably mounted in threaded apertures 81 of the vertical support 76. The other ends of the springs 78 are connected to a rod 82, end portions of which rest in recesses 83 in the ends of the tubular members 80.

The springs 78 provide the force to move the holders 70 with their pairs of clamps rapidly to the left to a starting position, after each testing operation of a component. Other vertical members 84 and 85 in the housing 77 carry adjustable stops 86 and 87 in the path of an actuator 88 carried by the holders 70 and movable relative thereto. The outer ends of the actuator 88 are positioned to engage alternately the stops 86 and 87. An intermediate cam portion 89 of the actuator is of the contour shown in FIG. 5 and is, at present, engaging surfaces 90 of the holders 70 to position the holders and their jaws in open position, but is also receivable in recesses 91 of the holders to permit the springs 73 to move the holders into closed positions and cause their clamps or jaws to grip their respective leads. While the carriage 72 is moving to the left to move the holders into their starting positions and prior to the carriage reaching the starting positions, the actuator 88 engages the stop 86 and the additional movement of the holders will move the recesses 91 to register with the cam-like element 89 to permit closing of the clamps on the leads of the next component ready for the start of the movement to the right with the component whose leads have just been clamped. The holder with the closed clamps will start its travel immediately at the same speed as the component being tested and prior to the holders and clamps reaching the end of their movement to the right, the actuator 88 will engage the stop 87 to hold the actuator against movement and causing opening of the clamping jaws as the recesses 91 leave the cam portion 89 and the surfaces 90 ride thereon.

The means for reciprocating the carriage 72 and controlling the action of the springs 78 is embodied in a cam 93 mounted on the shaft 61 and engaging a roller or cam follower 94 rotatably supported by the carriage 72. Another cam 95, mounted on the shaft 61, is adapted to a close a switch 96 after the clamps 67, 68, and 69 have been closed on the leads of the component and to open the switch prior to the releasing of the clamps from the leads.

As a result of each test, circuits are controlled to cause movement of the memory pin 45 of each nest 41 from its normal position, shown at A in FIG. 12, to an actuated position, shown at B in FIGS. 12 and 13, if the component passes the test. The means for bringing about this movement is a lever 98 pivoted at 99 and actuated by a solenoid 100, when energized, to locate a cam portion 101 of the lever in the path of the memory pin of the component just tested. The cam will, therefore, cause shifting of the memory pin 45 from the position A to the position B.

After leaving this position, that is the testing area 32, the component will be moved into the ejecting station where the component, if rejected, will be forced out of its nest and out of the apparatus. This feature is illustrated in FIG. 14 where the memory pin 45, having remained in its normal position A, will be adapted to engage a roller 104 carried by a lever 105 to move the lever about its pivot 106 and cause an adjustable element 107 to operate a switch 108 to energize a solenoid valve and cause air under pressure from a supply line 109 to pass through a nozzle 110 and force the rejected component out of its nest 41 and down a chute 111. It will be noted, by viewing FIGS. 4, 8, 9, and 10, that the end of each component, opposite the leads thereof, overhangs the nest 41 and it is against this portion that the jet of air is directed to force the rejected component out of the nest and down the chute 111.

Each component which has passed the test, after leaving the area of the ejecting means 33, approaches the end of the first conveyor 20 where it is received by an orienting element 114 pivotally supported at 115 (FIG. 1) by a bracket 116. The orienting element 114 is positioned above the chute 34 and its purpose is to raise the component out of its nest and to orient it so that it will drop down the chute with its leads uppermost. This is accomplished by guide members 117 and 118 positioned so that the member 117 will support the leads while the member 118 will support the opposing end of the component 25, A cam 119, mounted on the member 117, extends downwardly and is positioned to be engaged by the memory pin 45 to cause rocking of the element 114 about its pivot to thereby lift the component out of its nest and start its sliding movement on the members 117 and 118 toward the chute 34.

An abutment 120, in the form of a pin fixed to the member 117 adjacent the leading lead of the component, retards the movement of the lead carrying end of the component and in this manner, orients the component so that the end opposite the leads will drop first down the chute. Once this orienting motion has been started and carried out to the end of the function of the abutment 120, spaced guides 121 (FIG. 6) control the downward movement of the component in a given path so that it will drop onto the conveyor 35. The conveyor 35 includes a pair of spaced endless chains 122 extending around pairs of sprockets 123 which are free to rotate on spindles 124. Each pair of link structures of the chains 122 carries a support 124 with a divider 125 and an orienting pin 126. The dividers 125 function in pairs to maintain the separate positions of the components while the orienting pins 126 are mounted at staggered positions purposely to cause the components to drop alternately in opposite directions. In other words, the pins 126 are off-center from the path of the dropping component so that when each component drops on one of the pins, its unbalanced position, while being supported temporarily by the pin, will cause it to drop in one direction or the other and as a result, the components will be located as illustrated in FIGS. 6 and 7.

This may be termed the horizontal stacking of the components permitting them to be stacked uniformly, this not being possible if the lead ends were all on the same side due to the greater thickness of the heads 26. Furthermore, to accomplish this result, recognizing the occasional existence of a rejected component, the conveyor 35 is advanced in response to the memory pin of each accepted component as it leaves the conveyor 20 and is about to be transferred to the conveyor 35. As illustrated in FIG. 4, the memory pin 45 of the nest 41 of this component 25 is positioned to engage a roller 128 of a lever 129, pivoted at 130, and having a threaded projection 131, positioned to actuate a switch 132. This action will set into operation means for driving the conveyor 35 one position.

The driving means for the conveyor 35 begins with a shaft 134 (FIG. 2) which is driven continuously from shaft 38 through a sprocket and chain connection 135. The sprocket and chain connection 135, controlled by an idler 136 (FIG. 1), drives continuously two eccentrics 137 and 138, respectively, supporting pawls 139 and 140. The pawls 139 and 140 are conditioned when rendered effective to engage teeth 141 of a sprocket 142 mounted on the shaft 124 to advance the conveyor 35. The pawls 139 and 140, however, are subject to action depending upon their springs 143 and 144 which connect the pawls to their respective levers 145 and 146 which are pivoted at 147 and 148. Solenoids 149 and 150 have their cores 151 and 152 connected to their levers 145 and 146 at 153 and 154. When the solenoids 149 and 150 are de-energized, the weights of the pawls 139 and 140 will be sufficient to hold them free of engagement with the sprocket 142 which is normally held against rotation by a roller 155 urged by a spring 156 to engage the teeth of the sprocket. However, when either solenoid 149 or 150 is energized, sufficient force is embodied in the spring 143 or 144 to hold their repective pawls in positions so that during a cycle of the eccentrics 137 and 138, the pawl in operating position will cause advancement of the conveyor one position.

Returning now to FIGS. 3, 6, and 7, attention is directed to the supports 158 disposed upon each side of the conveyor to support the lead carrying ends of the components as they drop to one side and then the other, under the control of their orienting pins 126. During the intermittent advancement of the conveyor, additional guides or orienting means 159 engage certain of the leads to bring the components into horizontal stacked formation so that when they reach a position indicated at 160, they will start their movements up parallel ramps 161 to move the components so that they will extend partially above the dividers 125 where they may be removed readily in groups for stacking or packaging.

Attention is now directed to the wiring diagram of FIG. 16. Lines 163, 164, and 165 are to supply the necessary electrical energy to the motor 22. A main start switch 166 is actuated at the beginning of the operation of the apparatus. A safety switch 167, shown at the top of FIG. 2, is held closed normally by a member 168 of a lever 169 pivoted at 170 and having a feeler 171 positioned to permit properly positioned components in their nests to pass, but incorrectly positioned components cause actuation of the lever to open the switch and stop the apparatus.

A transformer 172 provides, through its secondary winding 173, electrical energy for the major circuits represented by main lines 174 and 175. The next step in starting the apparatus includes the closing of a start switch 176 to complete a circuit through a winding 177 of a relay to close its contacts 178 and 179. The contacts 179 are in the lines to the motor 22 and the contacts 178 are in a circuit with the winding 177 to maintain the winding of the relay 177 energized after releasing of the start switch 176.

The test circuit is in the form of a Wheatstone bridge 180 with like known resistances 181 in two of the arms, a variable potentiometer 182 in another of the arms, and the clamps 67, 68, and 69 to include resistances 183 and 184 of the component in the other arm of the circuit. In the present arrangement, the potentiometer 182 is set so that if the total resistances 183–184 of the component 25 being tested is equal thereto, then the component will be accepted and there will not be a current flow through the bridge line 185 which includes a winding of a relay 186. The source of electrical energy for the circuit is represented by a battery 187 in a circuit which includes normally open contacts 189 of a relay 190.

When relay 190 is energized during each cycle of the cam 95, its normally open contacts 191 are closed, to complete a circuit from line 174, through normally closed contacts 192 of relay 186, through closed contacts 191 and relay winding 193, to line 175. Energization of winding 193 of relay would close contacts 194 and 195. However, there is a momentary delay in the operation of the relay 193 so that, if the component or resistor 25 under test should not have the electrical characteristics required to create a balance in the test circuit and as a result, causes a flow of current through the bridge line 183 and winding of relay 186, the normally closed contacts 192 of relay 186 will be opened to prevent energization of the relay winding 193. Therefore, if all of the components or resistors 25 have the desired electrical characteristics and create a balance in the test circuit or, in other words, balances the reistance set in the potentiometer 182, the circuit including the relay 193, will be closed during each test, causing closing of a circuit through solenoid 100 to cause operation of the lever 98 (FIG. 2) to cause camming of the memory pin for each component into its operated or B position. This action, through the closing of contacts 195 of relay 193, completes a circuit through a counter 196 to count the number of components passing the test.

If a component fails to pass the test, its memory pin 45 will remain in its normal position causing closing of the switch 108 (FIGS. 14 and 16) to complete a circuit through a winding 198 of a solenoid valve 199, to open the valve, to permit air under pressure to pass through the nozzle 110, to force the rejected component out of the apparatus, that is, out of its nest and down a chute 111.

The lower portion of FIG. 16 illustrates a selector switch 200 in a line 201 extending from line 174 to be moved into engagement with its top or bottom contacts, depending upon the action desired for the conveyor 35. If, for example, the operator wishes the conveyor to move during each operating cycle or each rotation of the shaft 134 (FIG. 2), the selector switch 200 may be moved into engagement with its top contact to energize solenoid 149, to move its lever 145 upwardly (FIG. 3), to hold the pawl 139 continuously effective to engage the ratchet wheel 142 and move it one position during each operating cycle. The preferred position for automatic operation of the apparatus is for the selector switch to be in engagement with its bottom contact so that the advancing motions of the conveyor are responsive only to accepted components ready to leave the conveyor 20 and not responsive to any vacant nest which previously supported a rejected component. With this automatic arrangement, the operator may close a switch 202 at any desired interval to advance the conveyor to purposely bring about spacing of groups of horizontally stacked components.

*Operation*

During operation of the apparatus with the switch 166 closed and the start switch 176 closed to energize relay 177, to close its contacts 178 and 179, the motor 22 is energized and remains energized to drive the mechanism shown in FIG. 2. This driving mechanism provides a continuous advancement of the nests of the conveyor 20 in a given path toward the exit end of the conveyor. Furthermore, the driving means causes the cutting unit 31, with its cutting wheels 51 and 52, to sever the portion 30 from the leads 28 and 29 of each component 25 prior to reaching the testing station 32. To cooperate in the continuous movement of the components, the testing unit is provided with the mechanism, shown particularly in FIGS. 5 and 11, for gripping the respective leads of each component without disturbing the component in its nest, move with the component for a given distance, and, during this movement, include the component in the test set.

In the present instance, flat type resistors are being tested and the main portion of the test set includes a Wheatstone bridge circuit arranged so that the pair of arms including the resistor under test to be accepted must balance the other pair of arms including a potentiometer set at a known resistance value.

If the component passes the test, the solenoid 100 (FIG. 2) is energized to cause the cam 101 to move the memory pin 45 of the nest 41 of this particular component from its normal position A to its operated position B so that this particular component may pass through the ejecting area. The test or bridge circuit 180, if unbalanced, will cause a flow of current through the bridge line 185, to operate the relay 186, to prevent energization of the relay 193, to render ineffective the circuit including the solenoid 100 and also the circuit including the counter 196. As a result, the memory pin of the nest of the rejected component remaining in its normal position, will cause operation of the ejecting mechanism shown in FIG. 14, to close switch 108, to open valve 199, to cause air under pressure to force the rejected component out of the apparatus, out of its nest, and down the chute 111.

As each accepted component reaches the exit end of the first conveyor 20, switch 132 is closed to energize solenoid 150 (FIGS. 3 and 16) to rock the lever 146 so that through the force of spring 144, the pawl 140 will be moved into position to move the ratchet wheel 142 one position during the cycle of rotation of the shaft 134, to advance the conveyor 35 one position. While this is taking place, the component 25 enters the orienting element 114 and through the function of this element, the component is raised out of its nest as a result of the memory pin 45 actuating the cam 119 to start downward movement of the component. This downward motion of the component, on the members 117 and 118 of the orienting element 114, is controlled by the projection or retarding member 120 to hold the end of the component having the leads so that the component will turn into a vertical position to drop down the chute 34 with the leads uppermost. The component drops toward the second conveyor 35 and onto one of the pins 126 which is off-center with respect to the chute 34 and the guides 121, as illustrated in FIG. 6, to cause the component to drop to one side or the other depending upon the off-center position of the pin.

With this arrangement, there are no vacant positions in the second conveyor 35 and the components are caused to drop alternately to one side and then the other so that they may be disposed in a horizontally stacked formation. During the repeated advancements of the conveyor 35, the leads of the components engage the tapered surfaces 159 causing them to move inwardly into the stacked positions, after which the components will ride upwardly on the ramps 161 (FIGS. 3 and 7) causing them to move upwardly above the dividers 125 for removal from the conveyor.

With the possible exception of the feeding of the components to the first conveyor 20, the apparatus is completely automatic in its function to complete the structure of each component, by the removal of the excess portion 30 from the leads 28 and 29, to test the components, to remove the rejected components from the apparatus and to horizontally stack the accepted components in a predetermined formation, controlled only by the accepted components and not disturbed by empty nests previously holding rejected components. This action is made as rapidly as possible due to the continuous movement of the components in a given path and the completion of the structure of these components and the testing of the components during this continuous action.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing like components having leads extending from like ends thereof comprising:
   a continuously moving conveyor having successive portions moved in a straight line path,
   spaced nests on the conveyor for holding the components causing their leads to travel in a straight line adjacent the path,
   a unit having circuits to test the components singly mounted at a fixed position adjacent to the path,
   lead clamps included in the circuits and normally held open at one side and free of the conveyor,
   means operable to close the lead clamps on their respective leads of each component successively to include the components singly in the test circuits,
   means to move the lead clamps from a starting position to cause them to travel a given distance with the component on the conveyor being tested,
   a carriage provided for the lead clamps,
   means to support the carriage for movement parallel with the conveyor, and
   means actuatable to open the clamps free of the terminals short of the end of movement of the carriage and clamps with the conveyor.

2. An apparatus for testing like components having leads extending from like ends thereof comprising:
   a continuously moving conveyor having successive portions moved in a straight line path,
   spaced nests on the conveyor for holding the components causing their leads to travel in a straight line adjacent the path,
   a unit having circuits to test the components singly mounted at a fixed position adjacent to the path,
   lead clamps included in the circuits and normally held open at one side and free of the conveyor,
   means operable to close the lead clamps on their respective leads of each component successively to include the components singly in the test circuits,
   means to move the lead clamps from a starting position to cause them to travel a given distance with the component on the conveyor being tested,
   a carriage provided for the lead clamps,
   means to support the carriage for movement parallel with the conveyor,
   means actuable to open the clamps free of the terminals short of the end of movement of the carriage and clamps with the conveyor,
   a normally open switch adapted when closed to render the test unit effective,
   means actuable after the clamps are closed on the leads of a component to close the switch,
   said actuable means for the switch freeing the switch to open prior to the completion of the movement of the closed clamps the given distance, and
   means to return the clamps to the starting position.

3. An apparatus for testing like components having leads extending from like ends thereof comprising:
   a continuously moving conveyor having successive portions moved in a straight line path,
   spaced nests on the conveyor for holding the components causing their leads to travel in a straight line adjacent the path, a unit having circuits to test the components singly mounted at a fixed position adjacent to the path, lead clamps included in the circuits and normally held open at one side and free of the conveyor, means operable to close the lead clamps on their respective leads of each component successively to include the components singly in the test circuits, means to move the lead clamps from a starting position to cause them to travel a given distance with the component on the conveyor being tested, the lead clamps including pairs of opposing members carried by holders, means normally urging the holders toward each other to move the pairs of clamps into engagement with their leads, an actuator adapted to control opening and closing of the jaws and members, the actuator being elongated with ends extending beyond the holders, an intermediate cam portion for the actuator disposed in recesses of the holders when the jaws with their pairs of members are closed, a cam operated to move the holders to move a given distance with the conveyor and at the same speed, means responsive to the actuator to close the pairs of members on the leads, a control element mounted to engage and stop the actuator short of the end of the given distance to cause opening of the holders to move the members free of their leads prior to the completion of the movement said given distance, and said cam being adapted to effect movement of the holders and members in a reverse direction the given distance at a faster rate of speed and to position the pairs of members adjacent the leads of the next component.

4. An apparatus for testing like components each having leads disposed at one end thereof comprising:

a first conveyor movable continuously in a given path to an exit end, nests for the components mounted at spaced positions on the first conveyor and adapted to locate the leads of the components laterally on one side of the path, means operable to test the components successively during their movement, a second conveyor with an entrance end positioned beneath the exit end of the first conveyor, an orienting element adapted to receive the components from the exit end of the first conveyor and cause them to drop in a vertical line onto the second conveyor with their leads uppermost, the orienting element being pivotally supported, and a cam actuated to rock the element about its pivot to cause the element to lift each component at the exit end from its holder and to cause it to move downwardly.

5. An apparatus for testing like components each having leads disposed at one end thereof comprising:

a first conveyor movable continuously in a given path to an exit end, nests for the components mounted at spaced positions on the first conveyor and adapted to locate the leads of the components laterally on one side of the path, means operable to test the components successively during their movement, a second conveyor with an entrance end positioned beneath the exit end of the first conveyor, an orienting element adapted to receive the components from the exit end of the first conveyor and cause them to drop in a vertical line onto the second conveyor with their leads uppermost, the orienting element being pivotally supported, a cam actuated to rock the element about its pivot to cause the element to lift each component at the exit end from its holder and to cause it to move downwardly, and a retarding member mounted on the orienting element in the path of the lead carrying end of each component to hold movement of that end until the component approaches a vertical position with the leads extending upwardly.

6. An apparatus for testing like components each having leads disposed at one end thereof comprising:

a first conveyor movable continuously in a given path to an exit end, nests for the components mounted at spaced positions on the first conveyor and adapted to locate the leads of the components laterally on one side of the path, means operable to test the components successively during their movement, a second conveyor with an entrance end positioned beneath the exit end of the first conveyor, an orienting element adapted to receive the components from the exit end of the first conveyor and cause them to drop in a vertical line onto the second conveyor with their leads uppermost, each nest supporting a memory pin for movement between a normal position and an operating position, and means responsive to each component passing the test to cause movement of the memory pin of its nests into the operating position.

7. An apparatus for testing like components each having leads disposed at one end thereof comprising:

a first conveyor movable continuously in a given path to an exit end, nests for the components mounted at spaced positions on the first conveyor and adapted to locate the leads of the components laterally on one side of the path, means operable to test the components successively during their movement, a second conveyor with an entrance end positioned beneath the exit end of the first conveyor, an orienting element adapted to receive the components from the exit end of the first conveyor and cause them to drop in a vertical line onto the second conveyor with their leads uppermost, each nest supporting a memory pin for movement between a normal position and an operating position, means responsive to each component passing the test to cause movement of the memory pin of its nest into the operating position, the second conveyor having successive component receiving portions including a divider, and an orienting pin for each portion, the orienting pins being horizontally disposed alternately on opposite sides of the vertical line to cause the components to fall alternately in opposing directions.

8. An apparatus for testing like components each having leads disposed at one end thereof comprising:

a first conveyor movable continuously in a given path to an exit end, nests for the components mounted at spaced positions on the first conveyor and adapted to locate the leads of the components laterally on one side of the path, means operable to test the components successively during their movement, a second conveyor with an entrance end positioned beneath the exit end of the first conveyor, an orienting element adapted to receive the components from the exit end of the first conveyor and cause them to drop in a vertical line onto the second conveyor with their leads uppermost, each nest supporting a memory pin for movement between a normal position and an operating position, means responsive to each component passing the test to cause movement of the memory pin of its nest into the operating position, the second conveyor having successive component receiving portions including a divider, an orienting pin for each portion, the orienting pins being horizontally disposed alternately on opposite sides of the vertical line to cause the components to fall alternately in opposing directions, and guides disposed on opposite sides of the second conveyor to be engaged by the outer ends of the components to cause the components to be moved into horizontally stacked positions.

9. An apparatus for testing like components each having leads disposed at one end thereof comprising:

a first conveyor movable continuously in a given path to an exit end, nests for the components mounted at spaced positions on the first conveyor and adapted to locate the leads of the components laterally on one side of the path, means operable to test the components successively during their movement, a second conveyor with an entrance end positioned beneath the exit end of the first conveyor, an orienting element adapted to receive the components from the exit end of the first conveyor and cause them to drop in a vertical line onto the second conveyor with their leads upermost, each nest supporting a memory pin for movement between a normal position and an operating position, means responsive to each component passing the test to cause movement of the memory pin of its nest into the operating position, the second conveyor having successive component receiving portions including a divider, an orienting pin for each portion, the orienting pins being horizontally disposed alternately on opposite sides of the vertical line to cause the components to fall alternately in opposing directions, guides disposed on opposite sides of the second conveyor to be engaged by the outer ends of the components to cause the components to be moved into horizontally stacked positions, and ramps mounted on each side of the second conveyor to cause movement of the components vertically between the dividers and off their orienting pins.

10. An apparatus for testing like components each having leads disposed at one end thereof comprising:

a first conveyor movable continuously in a given path to an exit end, nests for the components mounted at spaced positions on the first conveyor and adapted to locate the leads of the components laterally on one side of the path, means operable to test the components successively during their movement, a second conveyor with an entrance end positioned beneath the exit end of the first conveyor, an orienting element adapted to receive the components from the exit end of the first conveyor and cause them to drop in a vertical line onto the second conveyor with their leads uppermost, each nest supporting a memory pin for movement between a normal position and an operating position, means responsive to each component passing the test to cause movement of the memory pin of its nest into the operating position, the second conveyor having successive component receiving portions including a divider, an orienting pin for each portion, the orienting pins being horizontally disposed alternately on opposite sides of the vertical line to cause the components to fall alternately in opposing directions, guides disposed on opposite sides of the second conveyor to be engaged by the outer ends of the components to cause the components to be moved into horizontally stacked positions, ramps mounted on each side of the second conveyor to cause movement of the components vertically between the dividers and off their orienting pins, and a chute mounted adjacent the exit end of the first conveyor to receive the components from the orienting element and guide them toward a receiving position of the second conveyor.

11. An apparatus for testing like components each having leads disposed at one end thereof comprising:

a first conveyor movable continuously in a given path to an exit end, nests for the components mounted at spaced positions on the first conveyor and adapted to locate the leads of the components laterally on one side of the path, means operable to test the components successively during their movement, a second conveyor with an entrance end positioned beneath the exit end of the first conveyor, an orienting element adapted to receive the components from the exit end of the first conveyor and cause them to drop in a vertical line onto the second conveyor with their leads uppermost, each nest supporting a memory pin for movement between a normal position and an operating position, means responsive to each component passing the test to cause movement of the memory pin of its nest into the operating position, the second conveyor having successive component receiving portions including a divider, an orienting pin for each portion, the orienting pins bing horizontally disposed alternately on opposite sides of the vertical line to cause the components to fall alternately in opposing directions, guides disposed on opposite sides of the second conveyor to be engaged by the outer ends of the components to cause the components to be moved into horizontally stacked positions, ramps mounted on each side of the second conveyor to cause movement of the components vertically between the dividers and off their orienting pins, a chute mounted adjacent the exit end of the first conveyor to receive the components from the orienting element and guide them toward a receiving position of the second conveyor, means operable to advance the second conveyor to present the next component receiving portion at the receiving position beneath the chute, and means responsive to each memory pin in an operating position to cause operation of the advancing means.

12. An apparatus for testing like components each having leads disposed at one end thereof comprising:

a first conveyor movable continuously in a given path to an exit end, nests for the components mounted at spaced positions on the first conveyor and adapted to locate the leads of the components laterally on one side of the path, means operable to test the components successively during their movement, a second conveyor with an entrance end positioned beneath the exit end of the first conveyor, an orienting element adapted to receive the components from the exit end of the first conveyor and cause them to drop in a vertical line onto the second conveyor with their leads uppermost, each nest supporting a memory pin for movement between a normal position and an operating position, means responsive to each component passing the test to cause movement of the memory pin of its nest into the operating position, and an element mounted in a path of the memory pins disposed in their operating positions to move them to their normal positions.

13. An apparatus for testing like components each having leads disposed at one end thereof comprising:

a first conveyor movable continuously in a given path to an exit end, nests for the components mounted at spaced positions on the first conveyor and adapted to locate the leads of the components laterally on one side of the path, means operable to test the components successively during their movement, a second conveyor with an entrance end positioned beneath the exit end of the first conveyor, an orienting element adapted to receive the components from the exit end of the first conveyor and cause them to drop in a vertical line onto the second conveyor with their leads uppermost, each nest supporting a memory pin for movement between a normal position and an operating position, means responsive to each component passing the test to cause movement of the memory pin of its nest into the operating position, the memory pin for each component failing to pass the test remaining in its normal position, and an ejector operated by each memory pin remaining in its normal position to force the component out of its nest.

References Cited in the file of this patent

UNITED STATES PATENTS

| | | |
|---|---|---|
| 2,468,843 | Sunstein | May 3, 1949 |
| 2,567,741 | Smith | Sept. 11, 1951 |
| 2,975,878 | Cason | Mar. 21, 1961 |
| 3,009,109 | Jankowski | Nov. 14, 1961 |